(12) United States Patent
Maunder

(10) Patent No.: US 11,507,105 B2
(45) Date of Patent: Nov. 22, 2022

(54) METHOD AND SYSTEM FOR USING LEARNING TO GENERATE METRICS FROM COMPUTER VISION-DERIVED VIDEO DATA

(71) Applicant: Sensable Inc., Fremont, CA (US)

(72) Inventor: Anurag Singh Maunder, Fremont, CA (US)

( * ) Notice: Subject to any disclaimer, the term of this patent is extended or adjusted under 35 U.S.C. 154(b) by 328 days.

(21) Appl. No.: 16/914,102

(22) Filed: Jun. 26, 2020

(65) Prior Publication Data

US 2020/0409383 A1    Dec. 31, 2020

Related U.S. Application Data

(60) Provisional application No. 62/921,593, filed on Jun. 27, 2019.

(51) Int. Cl.
*G06V 10/40* (2022.01)
*G05D 1/02* (2020.01)
*G06N 3/08* (2006.01)
*B25J 9/16* (2006.01)

(52) U.S. Cl.
CPC ............ *G05D 1/0246* (2013.01); *B25J 9/161* (2013.01); *B25J 9/163* (2013.01); *G05D 1/0221* (2013.01); *G06N 3/08* (2013.01); *G05D 2201/0216* (2013.01); *G06V 10/40* (2022.01)

(58) Field of Classification Search
CPC .. G06V 10/40; G06N 3/08; B25J 9/161; B25J 9/163; G05D 1/0246; G05D 1/0221
See application file for complete search history.

(56) References Cited

U.S. PATENT DOCUMENTS 9,652,838 B1 * 5/2017 Manmatha ........... G06V 10/421
2019/0355269 A1 * 11/2019 Pan ....................... H04L 67/306

FOREIGN PATENT DOCUMENTS

WO    WO-2011133714 A1 *    10/2011    ........... G06K 9/4671
WO    WO-2019129709 A1 *    7/2019     .............. A61F 11/08

* cited by examiner

*Primary Examiner* — Nicholas T Corbo

(57) ABSTRACT

The invention relates generally to a method and system that provides robust metric reporting based on analysis of computer vision derived-video data. The invention utilizes learning-based methods for object identification, object localization, and contextual analysis in order to generate insights into, for example, efficiency, productivity, design and planning, and health and safety compliance in a workflow environment.

20 Claims, 11 Drawing Sheets

METHOD AND SYSTEM FOR USING LEARNING TO GENERATE METRICS FROM COMPUTER VISION-DERIVED VIDEO DATA

CROSS-REFERENCE TO RELATED APPLICATION

This application claims the benefit of U.S. Provisional Patent Applications No. 62/921,593 entitled "METHODS AND SYSTEM FOR COLLECTING STATISTICS AND OBSERVATIONS FROM ACTIVITIES INSIDE A VIDEO FEED" filed on Jun. 27, 2019, which is commonly owned, and the disclosure of which is incorporated herein by reference in its entirety.

BACKGROUND

Field of the Invention

The invention relates, in general, to a method and system for analyzing video data captured in an environment in order to track activities related to objects and areas of interest within the environment, for the purposes of generating metric reports related to those activities.

Description of Related Art

In a variety of contexts there may be a desire to monitor various human and robotic activities to determine the occurrence or omission of certain events, for example, to comply with required procedures, rules, and policies. In an workplace setting, for example, such compliance oversights may result in injuries from failure to observe safety regulations, damage to equipment and goods, theft in business and retail establishments, and health and safety violations.

In conventional monitoring systems, such oversights in required procedures are typically identified using manual human analysis of recorded activities using sensors. Conventional systems require intensive human review and analysis of video data, which is time consuming, laborious, inherently inefficient, and prone to human error due to human fatigue, distractions, and the like.

In recent years, various companies have developed, and now offer, object tracking and computer vision-based tools to identify objects within video feeds, and infer potential activities occurring within these video feeds. For example, Video AI from Google® Cloud Intelligence and Amazon® Rekognition allow users to generate video metadata and text labels for the purposes of moderating video content, as well as providing content recommendations and contextual advertisements to viewers. These tools are primarily focused on using facial recognition and static (i.e., non-moving) object identification techniques to determine, for example, characteristics such as human emotions, gender, age, etc., as well as rudimentary object presence or absence recognition.

In addition, tools such as those provided by Clarifai Inc. and Matroid Inc. purportedly have the ability to identify objects, people, text, and the like in video data, and generate real-time alerts and signals based on pre-defined modeling.

However, none of the above-mentioned tools provide contextual metrics and reports based on analysis of motion activity within areas of interest in scene from a video feed.

Therefore, there is a need for an automated video analysis method and system which overcomes the aforementioned drawbacks of human analysis, and which provides robust metric reporting based on motion analysis within video data, as opposed to the limited object identification features offered by the aforementioned computer vision-based tools.

SUMMARY

A method for generating contextual metrics related to an activity occurring within an environment, comprising: transmitting a video feed from at least one video camera located in the environment to a server; receiving the video feed by the server; displaying, by the server, the video feed on a user device; receiving, by the server via the user device, a timepoint to generate a video still of the video feed; generating, by the server, the video still; displaying, by the server, the video still on the user device; receiving, by the server via the user device, at least one annotation that indicates an object of interest; receiving, by the server via the user device, at least one tracking parameter related to the object of interest; receiving, by the server via the user device, at least one reporting policy; determining, by the server, at least one contextual metric related to the object of interest based on the tracking parameter, wherein the contextual metric is determined using a computational geometry method; and generating, by the server, a report related to the contextual metric, wherein in order to determine the contextual metric, the server performs a first operation that utilizes a non-learning-based algorithm to identify the object of interest in a frame of the video feed, and wherein the server performs a second operation that utilizes a learning-based algorithm to identify the object of interest in the frame of the video feed if the first operation is unsuccessful.

A method for generating contextual metrics related to an activity occurring within an environment, comprising: transmitting a video feed from at least one video camera located in the environment to a server; receiving the video feed by the server; displaying, by the server, the video feed on a user device; receiving, by the server via the user device, a timepoint to generate a video still of the video feed; generating, by the server, the video still; displaying, by the server, the video still on the user device; receiving, by the server via the user device, at least one annotation that indicates an object of interest; receiving, by the server via the user device, at least one tracking parameter related to the object of interest; receiving, by the server via the user device, at least one reporting policy; determining, by the server, at least one contextual metric related to the object of interest based on the tracking parameter, wherein the contextual metric is determined using a computational geometry method; and generating, by the server, a report related to the contextual metric, wherein in order to determine the contextual metric, the server performs a first operation that utilizes a neighborhood-based tracking algorithm to localize the object of interest in a frame of the video feed, and wherein the server performs a second operation that utilizes a learning-based algorithm to localize the object of interest in the frame of the video feed if the first operation is unsuccessful.

system for generating contextual metrics related to an activity occurring with an environment, comprising: a video camera configured to capture a video feed in the environment; an edge server configured to receive the video feed from the video camera, the edge server configured to generate a modified video feed; and a platform server configured to receive the modified video feed, the platform server further configured to identify an object of interest within a plurality of frames in the modified video feed, the platform server further configured to localize the object of interest within the plurality frames in the modified video feed, the platform server further configured to determine at least one contextual metric related to the object of interest based on the tracking parameter, wherein the contextual metric is determined using a computational geometry method.

BRIEF DESCRIPTION OF THE DRAWINGS

These and other embodiments of the disclosure will be discussed with reference to the following exemplary and non-limiting illustrations, in which like elements are numbered similarly, and where.

DEFINITIONS

Figure 1:
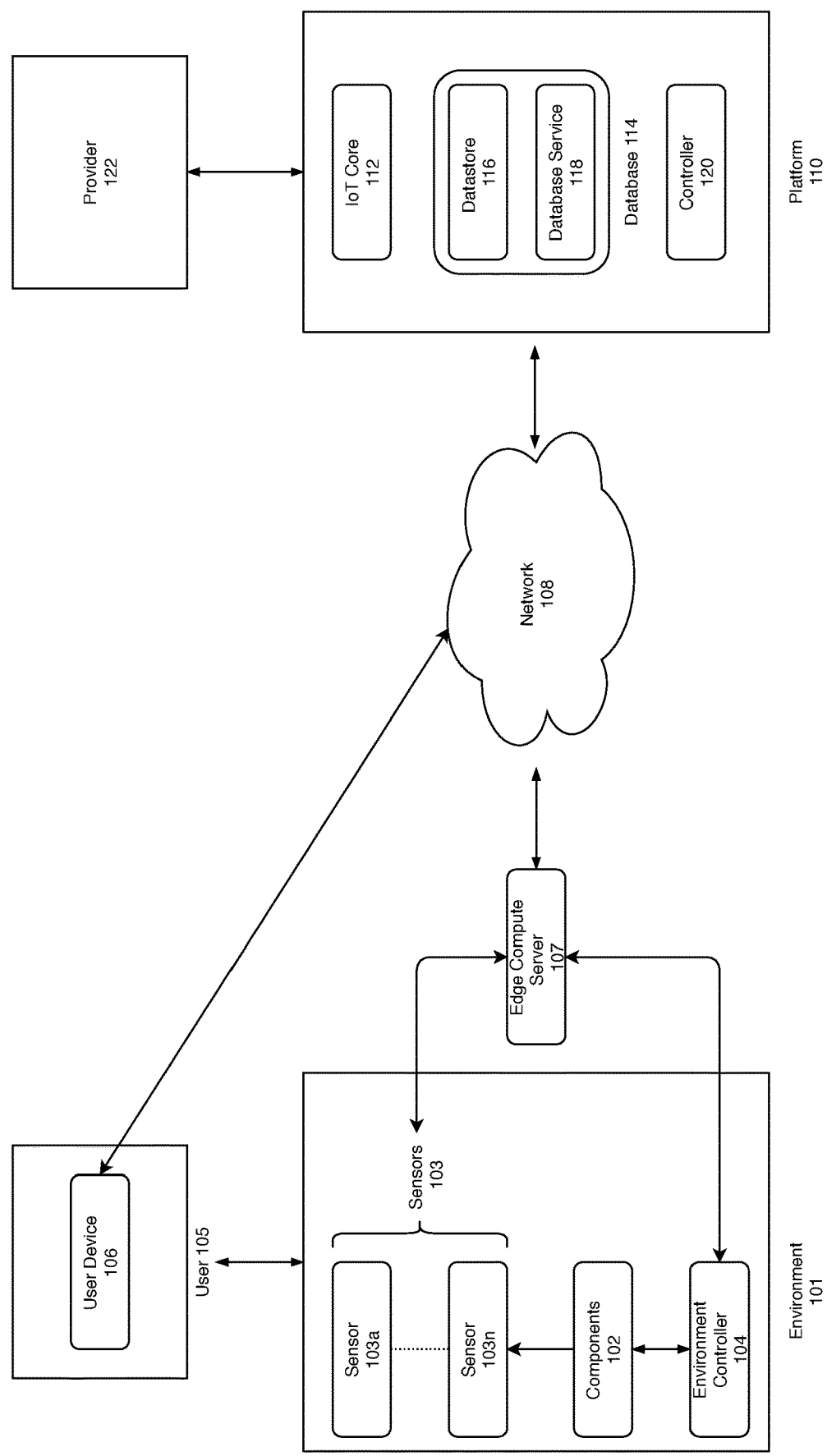
FIG. 1 is a network architecture diagram of a system for metric reporting of activity within a video feed, according to an embodiment of the invention.

The following definitions are meant to aid in the description and understanding of the defined terms in the context of the invention. The definitions are not meant to limit these terms to less than is described throughout this application. Such definitions are meant to encompass grammatical equivalents.

As used herein, the term "environment" can refer to, for example, a shipment fulfillment site, a manufacturing site, a retail location, a construction site, a farming site, an animal husbandry site, a warehouse, an inventory storage facility, a mail processing facility, a distribution center, a cargo receiving/loading dock, a maritime port, an airport, a medical facility, a library, an document and/or materials archive facility, long- and short-term storage facilities, a vault, and/or any other site or location that includes a conveyor belt system, an assembly line, a pick-and-place system, a sorting system, a routing system, robotic equipment, autonomous vehicles and/or machinery, or an environment which would otherwise benefit from the metric reporting of motion activity as described herein.

As used herein, the term "object" and "objects" can refer to, for example, a physical good or item, a location or area within an environment, a structure, a robot, a vehicle, machinery, equipment, machinery, a human, and/or an animal, and the like.

As used herein, the term "activity" and "activities" can refer to, for example, movement, lack of movement, motion, lack of motion, presence, non-presence, change of state, change of form, change of function, change of size, change of appearance, and/or traversal of objects, and the like.

As used herein, the term "sensor" and "sensors" can refer to, for example, cameras, devices and systems capable of capturing video, imagery, and audio data, as well as capable of capturing data corresponding to radar, lidar, laser scanning, thermal, temperature, humidity, oxygen and gas levels, infrared, range imaging, ultrasound, x-ray, and/or physiological parameters, and combinations thereof. These terms can also refer to a Robot Operating System (ROS) which logs and tracks movements and actions of a robot.

As used herein, the term "sensor data" can refer to, for example, data captured video, imagery, audio, radar, lidar, laser scanning, thermal, infrared, range imaging, ultrasound, x-ray, and/or physiological sensors, and combinations thereof. This term can also refer to data logs or records from a ROS.

As used herein, the term "metric" and "metrics" can refer to, for example, statistics, statistical analysis, information, mathematical calculations, facts, conclusions, derivations, deductions, interpretations, modeling, solutions, and/or organization, and the like, generated from an analysis of data.

As used herein, the term "component" and "components" can refer to, for example, equipment, systems, hardware, software, and/or devices, and the like, within the environment, including, but not limited to, robots, machinery, workstations, climate control systems, lighting control systems, access control systems, security systems, workflow management systems, supply chain management systems, personnel allocation systems, and the like.

As used herein, the term "video still" can refer to, for example, a still image, screenshot, snapshot, and/or screen capture, and the like, of a particular timepoint on a video feed.

As used herein, the term "learning-based algorithm" can refer to, for example, a deep learning network, neural network, a machine learning network, artificial intelligence computing, fuzzy logic computing, and the like.

DETAILED DESCRIPTION

It should be understood that aspects of the invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the invention is described with respect to its application for analyzing video data related to motion activity in a robotic environment, it is understood that the system could be implemented in any setting where metric reporting of any type of motion activity, either by, or of, a physical good or item, a structure, a robot, a vehicle, machinery, equipment, machinery, a human, or an animal, or any type of motion activity occurring within an environment.

FIG. 1 is a network architecture diagram of a system 100 for metric reporting of activity within a video feed, according to an embodiment of the invention. The system 100 is deployed in an environment 101. In an illustrative embodiment, the environment 101 is a shipment fulfillment site where various functions are performed. Such functions can include, but are not limited to, sorting items, picking items, labeling and packing items, scanning items, performing quality control on items, inspecting items, and routing items for shipment.

The environment 101 can include one or more sensors 103. In an embodiment, the environment 101 includes a plurality of sensors 103a-n. In an exemplary embodiment, the sensors 103 are video cameras.

In an embodiment, the sensors 103 can be fixed at permanent or semi-permanent locations within the environment 101 during an initial deployment of the system 100. The sensors 103 can be selectively mounted so that they are within a desired line of sight or viewing angle of a location to be monitored within the environment 101.

In another embodiment, the sensors 103 can be mobile, and are capable of being re-positioned to various locations within the environment 100 on-demand, either manually, or via feedback from the system 100. In this embodiment, the sensors 103 can be integrated, or affixed to, mobile devices, drones, unmanned aerial vehicles, autonomous vehicles, humans (i.e., such as in body-worn cameras and head-mounted cameras), and the like.

In an embodiment, the sensors 103 can rotate, tilt, pan, and zoom, either automatically based on feedback from the system 100, or by manual control. In another embodiment, the sensors 103 having fixed viewing angles and are not capable of viewing angle adjustment such as rotating, tilting, or panning.

In an embodiment, the sensors 103 can include 360 degree viewing capabilities, ultra-wide and wide-angle lenses, telephoto lenses, and the like.

In an embodiment, the sensors 103 can be hard-wired to the environment 101. In another embodiment, the sensors 103 can include a wireless transceiver capable of transmitting and receiving data.

In an embodiment, the sensors 103 can include an integrated power source, such as batteries, a renewable energy source such as solar panels, wind turbines, and the like. The sensors 103 can also include an electrical connection to a mains power source of the environment 101 (not shown), such as via, for example, wiring or power plugs.

In another embodiment, the sensors 103 can include both an electrical connection to the mains power source, as well as an integrated power source, where the two power sources provide for a primary and backup power supply in the event of a failure of one of the power sources. In yet another embodiment, the sensors 103 can have an electrical connection to a common dedicated power supply separate from the mains power source.

In an embodiment, the environment 101 can include different types of sensors, such that sensor 103a is a video camera, sensor 103b is a microphone, sensor 103c is a temperature sensor, and sensor 103d is a radar. This example is provided for illustrative purposes only, and any combination of numbers and types of sensors 103 may be utilized within the scope of this invention.

In an embodiment, the environment 101 can include an environment controller 104. The environment controller 104 can be coupled to various components 102. In an embodiment, the environment controller 104 can receive signals and feedback from the system 100 in order to control the various components 102 based on sensed and analyzed data, as described in more detail herein.

In an embodiment, a user 105 is associated with the environment 101. The user 105 can be, for example, affiliated with the environment 101, such as an employee, worker, manager, supervisor, consultant, equipment operator, operations personnel, facility maintenance personnel, security personnel, and the like. In another embodiment, the user 105 can be a third-party contracted to monitor the environment. The user 105 utilizes a user device 106 which is configured to display a user interface, as well as a metric reporting dashboard, both as which are described in more detail herein.

In an embodiment, the user 105 can be located remote from environment 101, or can be located within, or proximal to, the environment 101.

In an embodiment, the user device 106 is a computing device, such as, for example, a desktop computer, a laptop computer, a mobile phone, a tablet computer, a wearable device, a personal digital assistant (PDA), "smart" watches, glasses, and headsets, and/or any other computing device capable of rendering an output to a screen or display.

In an embodiment, the user device 106 can include an augmented reality, virtual reality, and/or mixed reality display. In another embodiment, multiple users can view content rendered by the system simultaneously on separate displays.

An edge compute server 107 is located between the environment 101 and a network 108, and the network 108 is located between the edge compute server 107 and a platform 110. The edge compute server 107 is communicatively coupled to the sensors 103 and the environment controller 104. In an embodiment, the sensors 103 and environment controller 104 can wirelessly communicate with the edge compute server 107, or the sensors 103 and environment controller 104 can be coupled to the edge compute server 107 via hard-wiring.

In an embodiment, the sensors 103 are communicatively coupled via a wireless mesh sensor network (not shown). The wireless mesh sensor network enables the collection of sensor data from sensors 103 located at various points or locations in the environment. In this embodiment, the edge compute server 107 may act as an access point for the wireless mesh sensor network, such that a multi-hop communication is established between the edge compute server 107 and the sensors 103. The wireless mesh sensor network topology has the benefit of reducing physical wires that are typically required to connect a number of sensors of a large physical area. In addition, if a sensor in the network experiences a failure or downtown, the wireless mesh sensor network can perform intelligent self-healing and activate the next most appropriate or optimal sensor for a given task.

In an embodiment, the system 100 can include a plurality of edge compute servers (not shown) which are co-located and associated with the sensors 103 and the environment 101.

The edge compute server 107 allows for distributed processing of sensor data by being physically closer to the environment 101 (i.e., at the "edge" of the environment 101 and the network 108), allowing various sensor data handling and processing functions of the platform 110 to be performed with reduced latency and more efficient response times.

In an embodiment, the edge compute server 107 includes at least one processing unit. The processing unit can include, but is not limited to, a vision processing unit (VPU), a graphic processing unit (GPU), a Tensor processing unit (TPU), an artificial intelligence accelerator application-specific integrated circuit (AI accelerator ASIC), a neural processing unit, a cognitive computing unit, and any other purpose-built processor utilized for AI and Internet-of-Things (IoT) edge computing.

The sensors 103 may capture a vast amount of data, such as video data, and wireless transmission of large amounts of such data analysis at the platform 110 may routinely result in bottlenecks and loss of potentially valuable sensor data. Therefore, in an embodiment, the system 100 can leverage the edge compute server 107 to partition a segment of the data processing from the platform 110. Such partitioning enables the platform 110 to selectively receive only those portions of sensor data from the sensors 103 likely to include video depicting objects of interest, and which satisfies the tracking parameters input to the platform 110, as described in more detail herein.

Furthermore, by utilizing the edge compute server 107, the system 100 is highly scalable, and allows for additional sensors 103 to be added without requiring, or marginally requiring, network bandwidth for sensor data transmission and processing.

In an embodiment, the network 108 includes one or more networks (not shown) such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, and/or any combination thereof.

In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), and the like, as well as any other suitable wireless medium, e.g., 3G, 4G, 5G, worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The network 108 is communicatively coupled to the platform 110. The platform 110 includes an IoT core 112, a database 114, and a controller 120. The IoT core 112 allows various components of the system 100 to securely interact with each other, allows the system 100 to scale, and reduces the bandwidth requirements of the network 108.

In an embodiment, the platform 110 is a standalone server, or a distributed server. In another embodiment, the platform 110 is a computing device, or multiple computing devices, which are located on the standalone server, or which are communicatively coupled across a distributed server environment.

In an embodiment, the database 114 can include a datastore 116 and a database service 118. The datastore 116 is configured to store sensor data, as well as any other data related to the system 100. In an embodiment, the datastore 116 is provided by Amazon® DynamoDB. In another embodiment, the datastore 116 can be blockchain-enabled and be stored across a distributed ledger.

In an embodiment, the database service 118 is a relational database service (RDS) that allows the system 100 to scale as sensor data storage and processing needs increase (i.e., as additional sensors 103 are added to the environment, and/or as additional tracking parameters are required by the user). In an embodiment, the database service 118 is provided by Amazon® RDS.

The controller 120 includes components to process and analyze the sensor data, and provide metric reporting. In an embodiment, the controller 120 can include multiple computing devices, such as a web-connected server or servers, and a network adapter for connecting to the network 108. In an embodiment, the controller 120 can further include input/output components for receiving tracking parameters, reporting policies, and other inputs from the user device 106. In an embodiment, the controller 120 can further include a memory (not shown) or any other non-volatile storage.

In another embodiment, the platform 110 is in a distributed server configuration, such that the IoT core 112, the database 114, and the controller 120, or any component thereof, is each cloud-based, and located remotely from each other on remote or virtual servers. Such a distributed server functionality can be provided by, for example, Amazon® Web Services, and the like.

In an embodiment, a provider 122 is associated with the platform 110. The provider 122 can be a developer, manufacturer, installer, licensor, owner, and the like, of the platform 110. In an embodiment, the provider 122 facilitates the deployment of the system 110 to the environment 101, including installation, implementation, and/or configuration of the sensors 103 and edge compute server 107.

In an embodiment, following deployment of the system 100, the provider 122 can provide real-time or on-demand support to the user 105. In an embodiment, the provider 122 can have unlimited or limited access to the platform 110 following deployment for the purposes of monitoring the platform 110 for various service level operations, such as, for example, up-time, maintenance, software patches and updates, error tracking, user support, trouble-shooting, and the like.

In the event that the provider 122 has limited access to the platform 110 following deployment, such limited access can be defined by the user 105 via the user interface. For example, the user 105 can specify that the provider 122 does not have access to actual sensor data, such as live video feeds, but rather, only anonymized or aggregated data. In another example, the user 105 can specify that the provider 122 only has access to the platform 110 during a service call initiated by the user 105.

Figure 2:
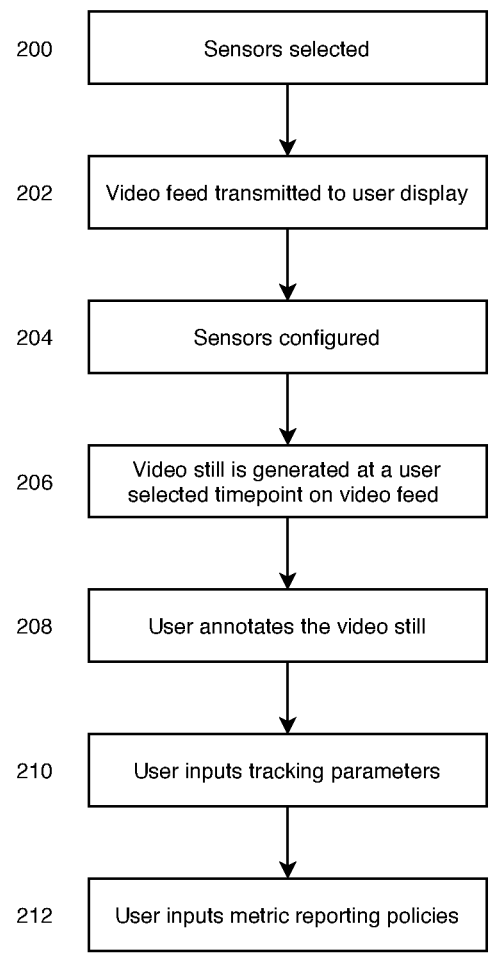
FIG. 2 is a flowchart illustrating the steps of inputting tracking parameters for capturing and analyzing motion activity within a video feed, according to an embodiment of the invention.

FIG. 2 is a flowchart illustrating the steps of inputting tracking parameters for capturing and analyzing motion activity within a video feed, according to an embodiment of the invention. In step 200, the sensors 103 are selected by the platform 110 based on the location of objects of interest within the environment 101 that the user 105 wishes to monitor. In an embodiment, the sensors 103 can be manually selected by the user 105 via the user interface. In another embodiment, the sensors 103 can be intelligently selected by the platform 110 based on predetermined inputs. For example, each sensor 103 can be assigned to a specific location with the environment 101, such that sensors 103a and 103b are focused on capturing data from a first region, and sensors 103c and 103d are focused on capturing data from a second region, and so on. The user can select to monitor, for example, the first region, and the platform can automatically activate data capturing from sensors 103a and 103b.

In another embodiment, the platform 110 can automatically select the appropriate sensors 103 based on learning-based processing of prior monitoring of the environment 101.

In step 202, after the sensors 103 are selected, a video feed is transmitted to the edge compute server 107 from the sensors 103. In an embodiment, the edge compute server 107 can process or pre-process the video feed and generate a modified video feed. Such processing can include, but is not limited to, adding metadata to the video feed, partitioning the video feed, identifying and marking objects in the video feed, localizing objects in the video feed, redacting portions of the video feed, tagging objects in the video feed, and the like. The modified video feed is then transmitted from the edge compute server 107 to the platform 110. The modified video feed is displayed on the user interface via the user display 106. In an embodiment, if multiple sensors 103 are selected, then the user can choose to selectively display a video feed from each sensor 103. In another embodiment, video feeds from each sensor can be simultaneously displayed on the user interface.

In step 204, the selected sensors 103 are configured so that the desired objects of interest are properly and accurately captured. In an embodiment, as the video feed is streaming to the user interface, the user 105 can manually zoom, rotate, pan, tilt, or otherwise focus each sensor 103 on the desired objects of interest.

In an embodiment, the user 105 can adjust various properties of the video feed, such as, for example, resolution, streaming quality (i.e., 4K, UHD, 1080p, 720p, etc.), and the like. In addition, the user can modify the size, sharpness, contrast, color balance, hue, tone, noise levels, and the like of the video feed.

In another embodiment, the selected sensors 103 are configured by the platform 110 based on a selection of an object of interest by the user via the user interface. For example, if the user desires to track a particular object displayed on the video feed, the user can select the object and the platform 110 automatically adjusts the appropriate sensors 103 so that particular object is within view, properly in-focus, and properly zoomed.

In step 206, as the video feed is streaming to the user interface, the user 105 can select a particular timepoint on the video feed where to make annotations in order to track objects of interest. The platform 110 generates a video still of the video feed at that particular timepoint. In an embodiment, the video still is generated by pausing the video feed at the particular timepoint. In another embodiment, the video still is generated by extracting an image of the video feed at the particular timepoint.

In step 208, the user 105 annotates the video still displayed on the user interface in order to select the desired objects of interest. The annotations can include, for example, shape selections, line markings, text, directional indicators, and the like. In an embodiment, the shape selections can be made around a region, in order to bound the region. Shapes such as a square, rectangle, circle, ellipse, and the like.

The shapes can also be made in free-form and can take any polygonal shape. In an embodiment, the shape selection can be made with a magnetic lasso tool which follows lines and outlines like a magnet, and facilitates the selection of regions having contours. For example, a robotic arm can be selected such that only the fingers and hand are selected via the magnetic lasso tool for tracking, and no other portions of robotic arm are tracked.

In an embodiment, the user 105 can provide spatial and/or vector coordinates to identify and select a desired boundary, line, or segment using X-Y and/or X-Y-Z coordinates.

In an embodiment, the annotations can include filters to specify that certain objects or regions to be removed, blurred, masked, obfuscated, or otherwise redacted from the video feed. Such filtering can be used, for example, to reduce video processing latency, for data privacy and confidentiality concerns or regulations, to address intellectual property issues, and for user preferences to reduce crowding and density of unimportant elements in the video feed.

In an embodiment, the user 105 can include filters to specify that certain objects or regions have adjusted video properties, such as adjusted resolution, size, sharpness, contrast, color balance, hue, tone, noise levels, and the like.

In an embodiment, the user 105 can specify the object recognition process to be used by the controller 120 for the entire video still, or selected objects of interest. For example, the user 105 can indicate that both background and foreground features of the video still are utilized, that only background reconstruction is utilized, or only foreground analysis is utilized.

Once selected by the user 150, the annotations are stored in the database 114 for subsequent use by the controller 120 during. In an embodiment, the user 105 can import pre-stored, or previously stored, annotations and apply such annotations to the video still.

In step 210, after the desired objects of interest are annotated on the video still, the user 105 inputs tracking parameters into the user interface. The tracking parameters can include, for example, activity criteria, threshold criteria, temporal criteria, spatial criteria, movement criteria, sensor type criteria, and the like, as described in more detail herein.

In an embodiment, activity criteria can include initiating or ending tracking based on a specific action or actions occurring relative to the object of interest. For example, to track the number of times an particular item falls off of a conveyor (i.e., a drop rate), the user 105 can define an activity as the item crossing either one of parallel boundary lines located on opposing sides of the conveyor.

In another example, to track if an object is successfully picked from a first region and placed in a second region (such as in a bin), or to track singulation of objects or mis-stows of objects, the user can define an activity as the object exiting a boundary for the first region and entering a boundary area for the second region.

In another example, to track the number of times a robot in a factory environment requires human intervention, the user 105 can define an activity as a human entering a boundary line for a region where the robot is located.

In another example, to track the number of times an autonomous vehicle transverses a loading zone, the user 105 can define an activity as the autonomous vehicle entering and/or exiting a boundary line for the loading zone.

In another example, to track the number of times a factory worker slips or falls in a particular region of the factory floor, the user 105 can define an activity as a downward movement of a human while within a boundary for the particular region.

In another example, to track the number of safety violations due to a factory worker entering a restricted area of the factory floor, the user 105 can define an activity as a human crossing a boundary for the restricted area.

In another example, to track how long a worker remains at a workstation, the user 105 can define an activity as a human present within a boundary for the workstation.

In an embodiment, threshold criteria can include maximum and minimum values for certain activities. For example, to track the number of times a particular object falls off conveyor more than two times within a tracking period, the user 105 can define a fall threshold of "2".

In another example, to track how long a factory floor maintains operations without a factory worker slipping or falling in a particular region of the factory floor, the user 105 can define a fall threshold of "1", whereby a timer indicating the safe operation duration will cease upon the occurrence of a fall.

In another example, to track compliance by factory workers of separation and social distancing guidelines and requirements, such as, for example, a 6-foot separation to reduce the spread of COVID-19, the user 105 can define a distance threshold of "6 feet".

In an embodiment, temporal criteria can include a specific time period to begin, pause, and end tracking. For example, to track movement of a robot during a one minute initialization procedure, the user 105 can define a temporal criteria of "1 minute".

In another example, to track utilization of machinery over an eight hour shift, the user 105 can define a temporal criteria of "8 hours".

In another example, to track if an autonomous vehicle takes longer than 10 minutes to pick up an item from a first region and deliver the item to a second region, the user 105 can define a temporal criteria of "10 minutes".

In another example, to track the number of times a robot experienced a failure and there was more than a two minute wait before human intervention arrived, the user 105 can define a temporal criteria of "2 minutes".

In another example, to track how long a particular workstation or assembly line station is empty or unattended for more than five minutes, the user 105 can define a temporal criteria of "5 minutes".

In an embodiment, spatial criteria can include distances, dimensions, depth, volume, and the like. In addition, spatial criteria can pertain to the positions of objects, robots, structures and humans relative to the environment 101, or relative to other objects, robots, structures and humans. For example, to monitor damaged rectangular boxes in a fulfillment center, the user 105 can define the spatial criteria as a "non-rectangular" shape. This spatial criteria allows the platform 110 to track the number of non-rectangular shaped packages, which would indicate potential distortion to the box.

In another example, to track the number of different types of packages being sorted, packed, or shipped in a fulfillment center, the user 105 can define the spatial criteria as various shapes, such as "box", "rectangle", "tube", "flat", "polygon", and the like.

In another example, to track the number of large boxes being sorted, packed, or shipped in a fulfillment center, the user 105 can define the spatial criteria as a dimension, such as "a height>3 feet" and "a width>4 feet". Similarly, the spatial criteria can be defined as a volume, such as "a volume>2 cubic meters".

In an embodiment, movement criteria can include values such as speed, velocity, direction, acceleration, angular rotation, degree of movement, and the like. For example, to track how often a robot manipulator with a 360 degree axis of rotation is required to rotate at least 180 degrees, the user 105 can define the movement criteria as ">=180 degrees".

In another example, to track how often an autonomous vehicle is required to reduce its speed below 3 MPH along a particular route, the user 105 can set the movement criteria to "<3 miles per hour".

In an embodiment, the user 105 can further select tracking parameters based on specific types of sensor data desired to be captured. For example, based on the capabilities of the sensors 103, the user 105 can select that data related to, for example, thermal, temperature, humidity, oxygen and gas, infrared, range, ultrasound, x-ray, and physiological monitoring are captured as sensor data.

In an embodiment, multiple tracking parameters can be combined by the user 105 so that activities can be tracked based on specific threshold criteria, spatial criteria, movement criteria, and the like. For example, the user 105 can set the tracking parameters so that the controller 120 can monitor a drop count of a pick-and-place robot and simultaneously track a pick rate, singulation count, and mis-stow rate of the same robot.

In an embodiment, the user interface can display various pre-stored, pre-defined, or previously stored tracking parameters which are pre-defined by the provider 122, or by the user 105. For example, during a deployment phase of the system 100, the user 105 can create the tracking parameters, which are later used as the pre-defined tracking parameters.

In addition, the user interface further allows the user 105 to create and define custom tracking parameters. Such custom tracking parameters can be saved to the platform 110, and retrieved for a subsequent tracking or monitoring need during a future time period.

The types and scopes of tracking parameters that can be defined by the user 105 can relate to other situations where it is desirable to monitor or track an object of interest, especially in the context of scenarios which include repetitive movements or moving objects, robots, vehicles and/or humans. The aforementioned examples are non-limiting and are not intended to limit the scope of the invention.

Once selected by the user 105, the tracking parameters are stored in the database 114 for subsequent use by the controller 120.

In step 212, the user 105 inputs metric reporting policies into the user interface. The metric reporting policies are used to trigger the generation of reports, notifications, alerts, or messages based on tracking parameter-based analysis of the sensor data by the platform 110. The user 105 can select various criteria, such as reporting frequency, reporting times and/or time periods, content format of reporting (such as, for example, visual displays, textual reports, or a combination of both), recipients of the metric reporting, transmission means of the reporting (such as, for example, e-mail, facsimile, text messaging, intra-company or intra-organization messaging, chat messaging, routing to remote printer, etc.), format of reporting file (such as, for example, a spreadsheet, a document, a slide presentation, a PDF, an image, etc.), and the like. The recipient(s) of the metric reporting can be input by the user 105 at the time of selecting the metric reporting policies, can be displayed to the user 105 based on a pre-stored recipient list, and the like.

For example, the user 105 can define a metric reporting policy to generate a metric report on an hourly, daily, weekly, monthly, etc. basis.

In another example, the user 105 can define a metric reporting policy to send a notification if a human enters or leaves a particular region on a factory floor.

In another example, the user 105 can define a metric reporting policy to send a notification to a designated worker if a robot does not move for a predetermined period of time (indicating a stall, failure, or blockage).

In another example, the user 105 can define a metric reporting policy to generate a metric report if a number of motion detections in a particular region exceeds a threshold value.

In an embodiment, multiple metric reporting policies can be combined by the user 105 so that a reporting time, transmission means, and format of the reporting file, and the like can be utilized. For example, the user 105 can set the metric reporting policies so that an e-mail is generated on a weekly basis, that the report includes visual displays, that the report is attached to the e-mail as a PDF file, and that the recipient of the e-mail is a factory floor supervisor.

In an embodiment, the user interface can include various pre-defined metric reporting policies which are pre-defined by the provider 122, or by the user 105. For example, during a deployment phase of the system 100, the user 105 can create the metric reporting policies, which are later used as the pre-defined metric reporting policies.

In addition, the user interface further allows the user 105 to create and define custom metric reporting policies. Such custom metric reporting policies can be saved to the platform 110, and retrieved by the user 105 a subsequent tracking or monitoring need.

The types and scopes of metric reporting policies that can be defined by the user 105 can relate to other situations where it is desirable to monitor or track an object of interest, especially in the context of scenarios which include repetitive movements or moving objects, robots, vehicles and/or humans. The aforementioned examples are non-limiting and are not intended to limit the scope of the invention.

Once selected by the user 105, the metric reporting policies are stored in the database 114 for subsequent use by the controller 120.

In an embodiment, in order to select and define both the tracking parameters and metric reporting policies, the user 105 can input a semantic query, whereby the platform 110 performs natural language processing on the query and generates suggested tracking parameters or reporting policy. For example, the user 105 can input "Monitor how many times factory worker X leaves workstation Y, and send a metric report to supervisor Z at the end of the day." The platform 110 can analyze this input, and suggest tracking parameters which detect when the factory worker exits a boundary of the workstation, and suggests reporting policies which generate an email for the supervisor on a daily basis related to this activity.

In an embodiment, the user 105 can make selections via the user interface using an input mechanism such as a keyboard, pointing device, mouse, trackball, touch pad, touchscreen, or stylus. In another embodiment, the user 105 can make selections using voice commands. In another embodiment, the user interface can be coupled to an augmented, virtual or mixed reality display where the user can make selections using gesture, head, gaze, and/or eye movements.

Figure 3:
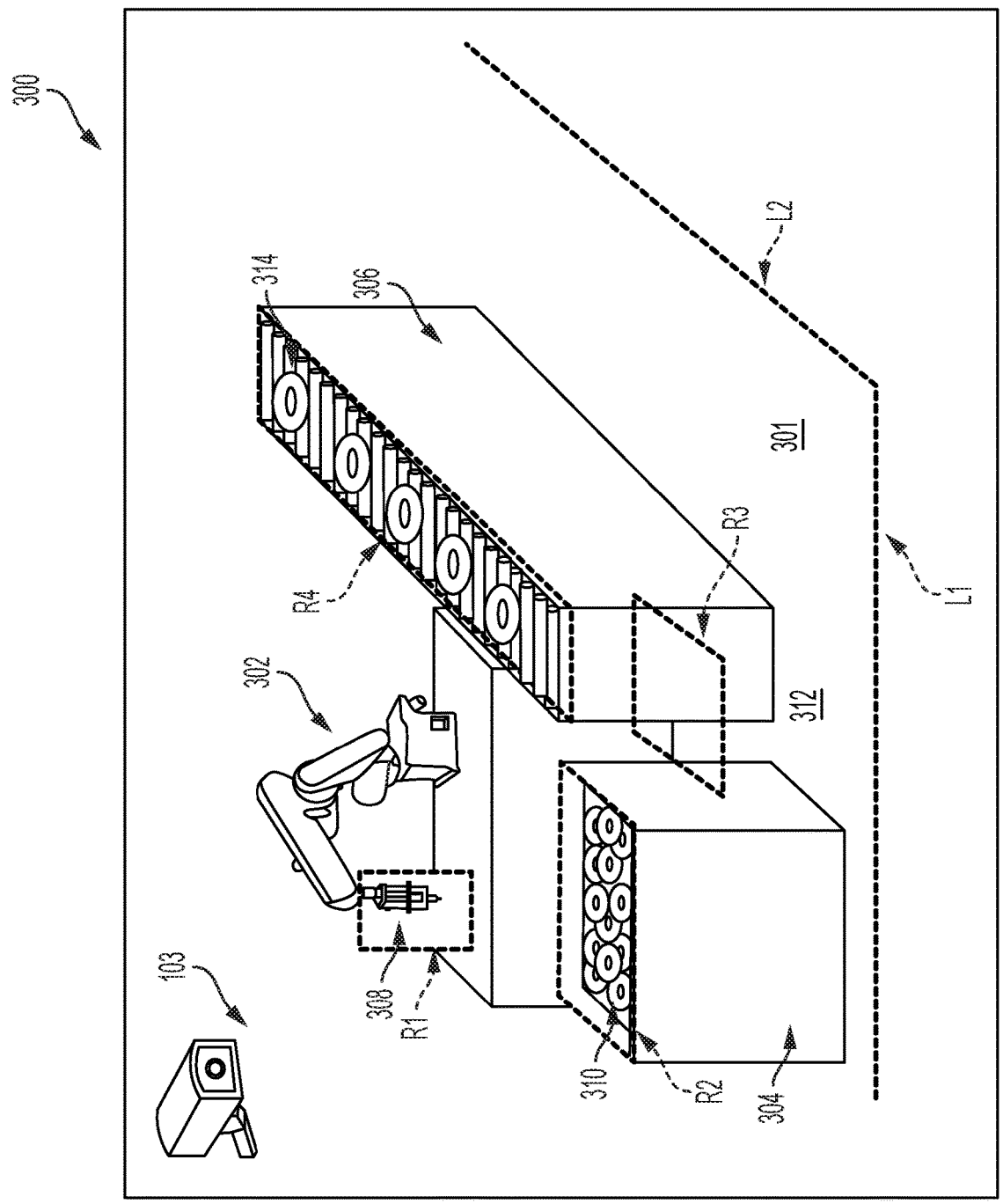
FIG. 3 is a depiction of a video still annotated with objects of interest in a robotic pick-and-place environment.

FIG. 3 is a depiction of a video still 300 annotated with objects of interest in a robotic pick-and-place environment, according to an embodiment of the invention. In an embodiment, the video still 300 depicts a shipment fulfilment site, where a region 301 is bounded by boundary lines L1 and L2. The location includes a robotic manipulator 302, a storage bin 304, and a conveyor 306. In the illustrative example shown, the user 105 has selected to track the end-effector 308 of the robotic manipulator 306 by placing a rectangle R1 around the end-effector 308. The user 105 has also selected to track items 310 exiting the storage bin 304 by placing a rectangle R2 around the opening of the storage bin 304. The user 105 has also selected to track a drop zone 312 located between the storage bin 304 and the conveyor 306 by placing a rectangle R3 around the drop zone 312. The user 105 has also selected to track the items 310 placed onto the conveyor 306 by placing a rectangle R4 around the conveyor belt 314.

In this embodiment, the annotations on the video still 300 can be used by the platform 110 to track, for example, picking of items 310 by the end-effector 308 from the storage bin 304, and placement of the items 310 by the end-effector 308 onto the conveyor belt 314. The controller 120 can track various metrics related to the selected annotations, such as, for example, pick and speed rate of the end-effector 308, singulation count of the items 310 placed onto the conveyor belt 314, drop count of items 310 falling into the drop zone 312, and safety violations occurring from humans or other objects crossing the boundary lines L1 and/or L2 into the location 301.

Figure 4:
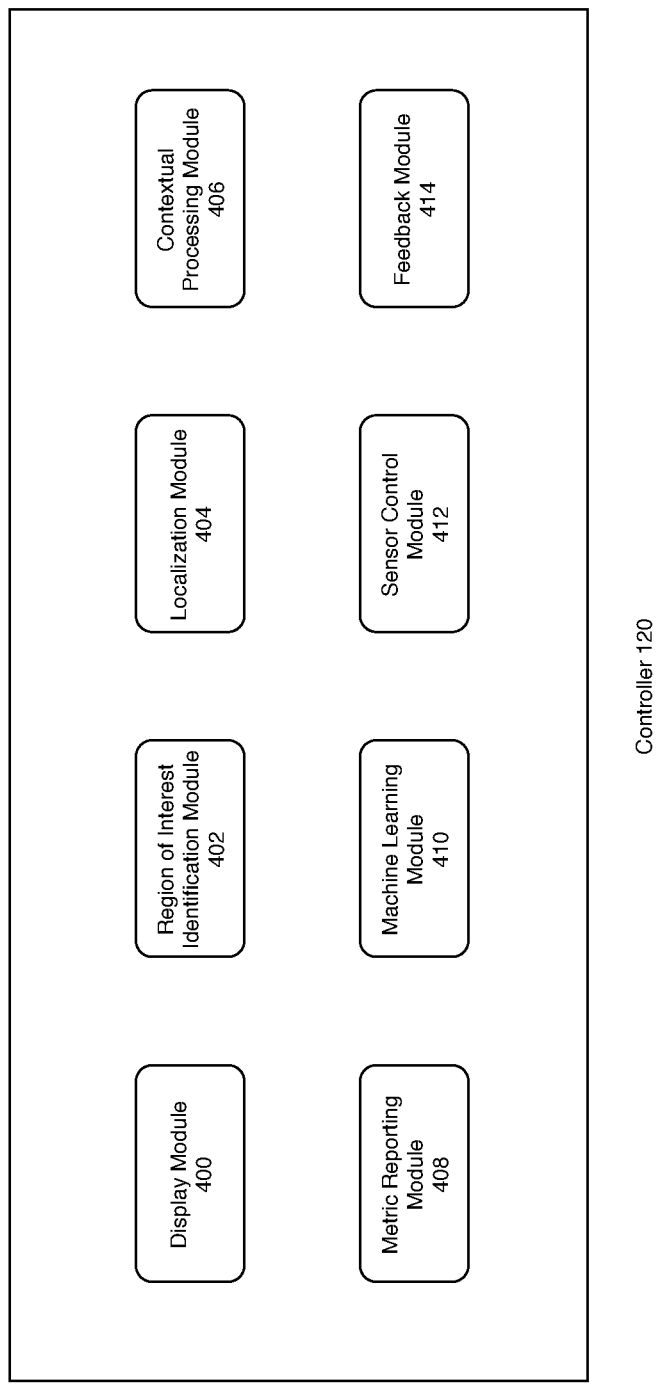
FIG. 4 is a block diagram of modules within a controller, according to an embodiment of the invention.

FIG. 4 is a block diagram of modules within the controller 120, according to an embodiment of the invention. In an embodiment, the controller 120 includes a display module 400, an object of interest identification module 402, a localization module 404, a contextual processing module 406, a metric reporting module 408, a machine learning module 410, a sensor control module 412, and a feedback module 414.

In an embodiment, each module 400-414 is a processing unit, such as, for example, a VPU, a GPU, a TPU, an AI accelerator ASIC, a neural processing unit, a cognitive computing unit, and any other purpose-built processor utilized for AI and IoT computing. In another embodiment, the controller 120 can include a single processing unit (not shown) that contains each module 400-414.

In an embodiment, the display module 400 is configured to generate, render, and/or otherwise output graphical information to the user device 106. The display module 400 can generate the user interface for the input, editing, retrieval, and selection of tracking parameters and metric reporting policies.

Figure 10:
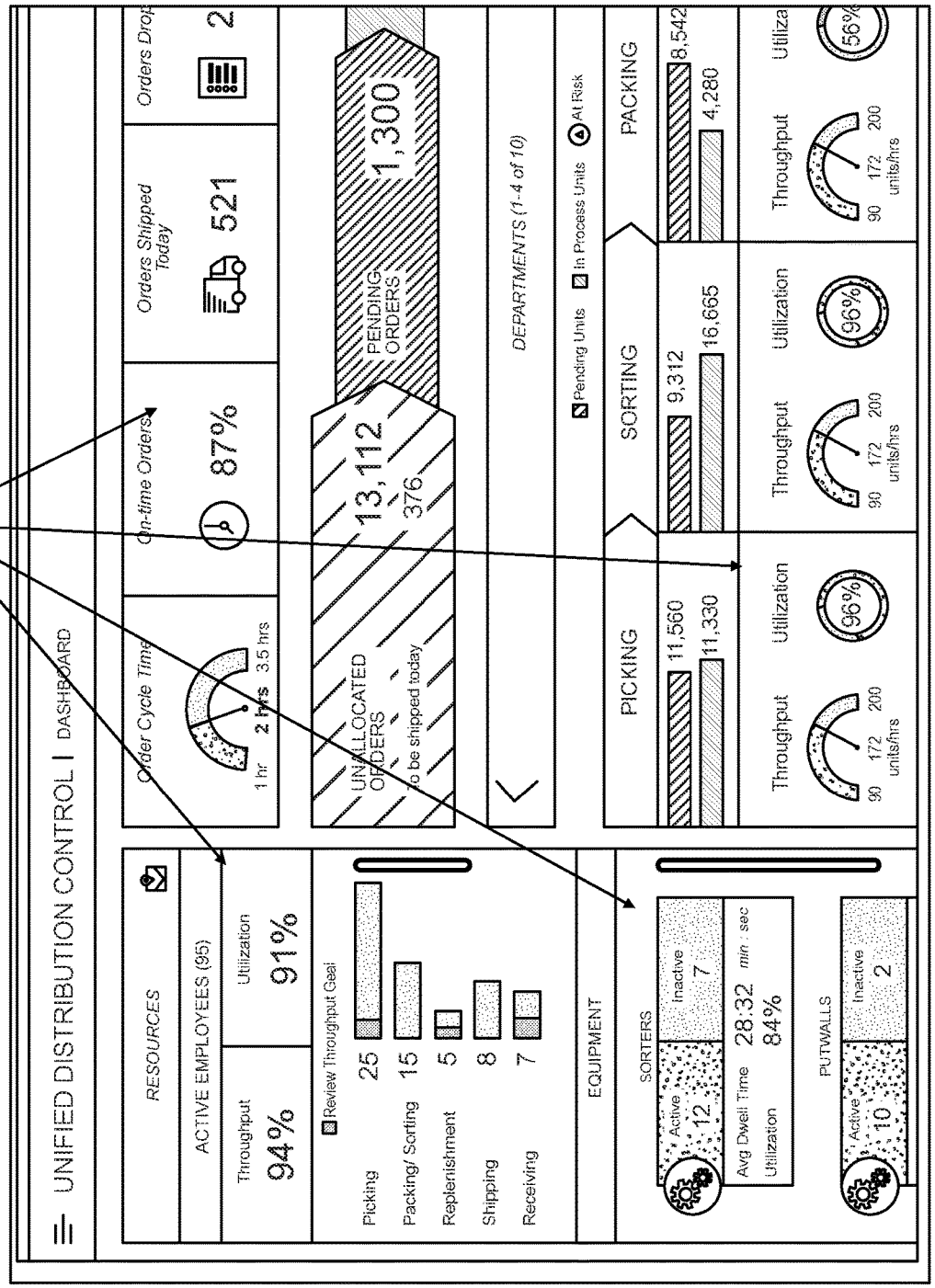
FIG. 10 is a depiction of an exemplary metric reporting dashboard, according to an embodiment of the invention.

In addition, the display module 400 can render metric reports for output on the metric reporting dashboard, as described in more detail herein with reference to FIG. 10. The display module 400 can further render sensor data in various formats, including a live camera view, a traffic view, a thermal imaging view, and various other views that can include overlaid (i.e., augmented) content such as, for example, hotspot bubbles, labels, markers, and real-time sensor data values and reporting metrics.

In an embodiment, the object of interest identification module 402 is configured to identify the objects of interest within the video feed, based, at least in part, on the annotations retrieved from the database 114. In an embodiment, the object of interest identification module 402 processes the video feed using a learning-based algorithm which is configured to segment, localize, and classify objects and portions within the video feed.

In another embodiment, the object of interest identification module 402 processes the video feed using a non-learning-based algorithm that relies on feature extraction in order to extract features from the video feed in order to identify and classify objects and portions within the video feed. The non-learning-based algorithm can utilize, for example, feature detector and descriptor extractors including, but not limited to, speeded up robust features (SURF), scale-invariant feature transform (SIFT), Oriented FAST and rotated BRIEF (ORB), Binary Robust Invariant Scalable Keypoints (BRISK), KAZE, AKAZE, and the like. In an embodiment, the non-learning based algorithm can utilize look-up tables and correlation algorithms to detect objects and regions with the video feed.

In an embodiment, the object of interest identification module 402 can utilize both a learning-based algorithm and a non-learning-based algorithm to identify and classify objects and portions with the video feed. For example, a learning-based algorithm can be used as a primary step, and if it is unsuccessful, the non-learning-based algorithm is used as a secondary step by the object of interest identification module 402, and vice-versa.

In an embodiment, the object of interest identification module 402 can further prompt the user 105 to select the objects of interest on the video feed. In this embodiment, the object of interest identification module 402 may prompt the user if the aforementioned automatic identification processes are not successful, cannot accurately identify all of the desired objects of interest based on the annotations, or requires manual verification of the identified objects.

In an embodiment, the localization module 404 is configured to localize each object of interest within each received frame in the video feed. The localization module 404 performs such localization by observing the position of the object of interest in every single frame of the video feed. The localization can be performed using a learning-based algorithm.

In an embodiment, the localization can be performed by searching for the object of interest in a neighborhood in every single frame in the video feed. Neighborhood-based tracking may be advantageous when the object of interest is relatively small, and thus the search space in each frame is limited. In addition, neighborhood-based tracking may also be advantageous for tracking multiple objects of interest simultaneously within each frame. The neighborhood-based tracking may be performed by the localization module 404 using, for example, a spatial-temporal neighborhood trajectory analysis algorithm, spatial neighborhood-constrained linear coding, the shortest path faster algorithm, and the like.

In an embodiment, the localization module 404 can intelligently determine an appropriate localization method to utilize, based on, for example, the number of objects of interest, the sizes and shapes of the objects of interest, the density and level of crowding in the video feed, the level of occlusion within the video feed relative to the objects of interest, and the like.

In an embodiment, the localization module 404 can utilize both the learning-based algorithm and a neighborhood-based tracking algorithm For example, a learning-based algorithm can be used as a primary step, and if it is unsuccessful, the neighborhood-based tracking algorithm is used as a secondary step by the localization module 404, and vice-versa.

In an embodiment, the contextual processing module 406 is configured to analyze the video feed in order to identify various contextual metrics, based, at least in part, on the tracking parameters received from the database 114. In an embodiment, the contextual processing module 406 utilizes measurement and computational geometry methods to identify contextual metrics related to the objects of interest, and based on the tracking parameters. Such contextual metrics can be those defined by the tracking parameters, and can include, for example, dwell times, intersections, sizes, and the like, of objects of interest, objects located within such regions, activities occurring within such regions, etc.

In an embodiment the measurement and computational geometry methods can include, for example, photogrammetry, optical flow estimation techniques, combinatorial geometry, algorithmic geometry, and other techniques related to measuring geometric objects and discrete entities, as well as related to depth estimation for computer vision applications.

In an embodiment, the sensors 103 may provide depth and/or range information along with the sensed data, and such information may be relayed along with the video feed as metadata. The depth and/or range information can be utilized by the contextual processing module 406 to find a three-dimensional location or coordinates of the object of interest, as well as its size.

However, if the sensors 103 do not provide depth and/or range information, then the contextual processing module 406 can utilize the relative size of the object of interest in the video frame to measure various aspects of the object of interest.

In an embodiment, the contextual processing module 406 can also utilize learning- and non-learning based algorithms for tracking and counting of the objects of interest.

In an embodiment, the analysis generated by the contextual processing module 406 can be stored on the database 114, and can also be transmitted directly to the metric reporting module 408 and/or the machine learning module 410, as described in more detail herein.

In an embodiment, the metric reporting module 408 is configured to generate metric reports based, at least in part, on the metric reporting policies retrieved from the database 114 and the analysis generated by the contextual processing module 406. In an embodiment, the analysis can be formatted in a human-readable language, such as extensible markup language (XML), JavaScript Object Notation (JSON), YAML Ain't Markup Language (YAML), Protobuf, Avro, MongoDB, OData, and the like, and the metric reporting module 408 includes tools to read and parse the human-readable language.

In another embodiment, the analysis is stored on the database 114, and placed into a relationship database by the database service 118. In this embodiment, the analysis is formatted in a non-human-readable language format, such Amazon® RDS, Structured Query Language (SQL), MySQL, Oracle® Database, IBM® Db2, PostgreSQL, SAP® HANA, SQLite, MariaDB, and the like.

In an embodiment, the metric reporting module 408 can generate static metric reports that are displayed on the user interface, electronically transmitted to third-parties, or printed to a physical medium. In another embodiment, the metric reporting module 408 can generate interactive metric reports which are displayed on the user interface, and which allow the user 105 to manipulate various aspects of the displayed metrics, which are described in more detail herein with reference to FIG. 10.

In an embodiment, the machine learning module 410 is configured to receive and process data generated by at least one of the object of interest identification module 402, the localization module 404, and the contextual processing module 406. In an embodiment, the machine learning module 410 may apply one or more machine learning algorithms to the analysis generated by the contextual processing module 410. Specifically, the machine learning module 410 can analyze time-varying object of interest values (i.e., such as motion, activities, and the like) that characterize the object of interest during a current time period. The machine learning module 410 can use this analysis to establish a correlation between these time-varying object of interest values and events detected during the current time period, such as for example, singulation counts, error counts, drop rates, pick rates, speed rates, mis-stow rates, safety violations, and the like. These correlations can be utilized by the controller 120 to predict an expected relationship between these object of interest values and events during a future time period.

For example, and as described above, the contextual processing module 406 may identify a count of boxes which fall off of a conveyor belt when a robot placing the boxes onto the conveyor belt is operating at a relatively high speed. The machine learning module 410 can analyze the operating speed of the robot and the count of dropped boxes during the current time period, and establish a correlation between the operating speed and drop rate. This correlation can be used by the contextual processing module 406 during a future time period to predict drop rates, as well as be used by the feedback module 414 to adjust operating parameters of the components 102.

In an embodiment, the machine learning module 410 may associate a semantic meaning to all data points within the sensor data, including, but not limited to, parameters, variables, activities associated with the object of interest, activities occurring within the video feed, other objects within the video feed, and the like. The semantic meanings can be stored in the database 114, and later retrieved by the controller 120 for subsequent analysis during a future time period in order to, for example, optimize object of interest identification, localization, contextual processing, and sensor control, as well as to facilitate natural language processing of semantic queries from the user 105.

The module 410 is not limited to utilizing machine learning, and module 410 can incorporate other learning-based algorithms, such as, for example, a deep learning network, neural network, artificial intelligence computing, fuzzy logic computing, and the like.

In an embodiment, the sensor control module 412 is configured to control the sensors 103 based on, at least in part, the analysis generated by the contextual processing module 406 and/or data received from the machine learning module 410. In an embodiment, if an object of interest is occluded, not fully in view, or otherwise not recognizable, the sensor control module 412 can transmit a feedback signal to the appropriate sensor 103 which causes the sensor 103 to rotate, tilt, pan, and/or zoom in order to capture a more optimal view of the object of interest. In an embodiment, the sensor control module 412 can selectively activate another sensor 103 which may have a different or more optimal view of the object of interest. If the sensor 103 is a mobile sensor, then the sensor control module 412 can transmit a signal which causes the sensor 103 to be re-positioned or moved to another location that provides a different or more optimal view of the object of interest.

In an embodiment, the sensor control module 412 can receive learned (i.e., analyzed historical data) from the machine learning module 410 indicating whether a particular sensor is more optimal over another sensor, based on prior tracking and monitoring of the object of interest. If the learned data indicates that, for example, sensor 103a has a more optimal view of the object of interest than the current sensor 103b, then the sensor control module 412 can selectively activate sensor 103a and deactivate sensor 103b.

In an embodiment, the feedback module 414 is configured to adjust operating parameters of the component 102 based on, at least in part, the analysis generated by the contextual processing module 406 and/or data received from the machine learning module 410. In an embodiment, feedback module 414 can transmit a feedback signal to the environment controller 104 which causes the environment controller 104 to modify the operation of one of more components 102.

Using the aforementioned example where the machine learning module 410 establishes a correlation between an operating speed of a robot and a high drop rate, the feedback module 414 can transmit a signal to the environment controller 104 to reduce the operating speed of the robot. This example is non-limiting and is not intended to limit the scope of the invention.

In an embodiment, one or more of the modules 400-414 can be located on the edge compute server 107. In this embodiment, the distribution of modules 400-414 can be selected during the deployment phase of the system 100, based on, for example, network bandwidth, latency, and data privacy considerations.

In another embodiment, various functions of each module 400-414 can be distributed between processing units located on the edge compute server 107 and on the controller 120. In this embodiment, the controller 120 can intelligently determine which modules 400-414 to process on the edge compute serve 107, based on, for example, the amount of processing resources, anticipated latency, anticipated bandwidth required, available bandwidth, and the like. If the anticipated bandwidth required to transmit the sensor data across the network 108 between the environment 101 and the platform 110 is expected to increase latency in processing the sensor data, the controller 120 can allocate the functions of, for example, the object of interest identification module 402, the localization module 404, and the contextual processing module 406 to the edge compute server 107. The controller 120 can locally carry out the functions of the remaining modules 400 and 408-414.

In yet another embodiment, the controller 120 and all modules 400-414 contained therein can reside on, and be executed by, the edge compute server 107.

Figure 5:
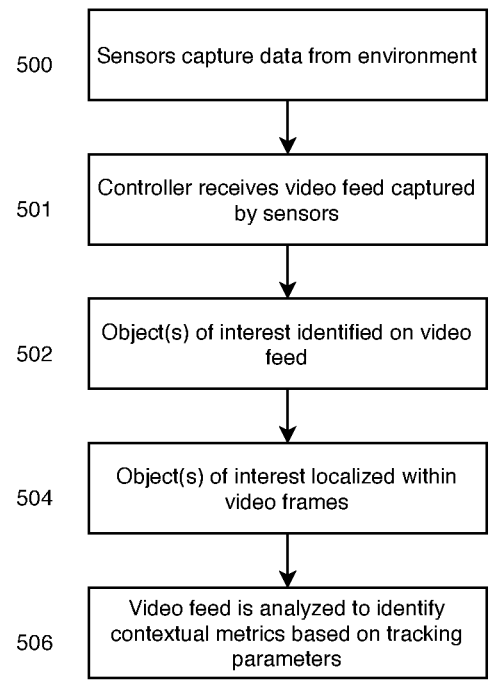
FIG. 5 is a flowchart illustrating the steps of analyzing a video feed in order to generate metric reporting, according to an embodiment of the invention.

FIG. 5 is a flowchart illustrating the steps of analyzing a video feed in order to generate metric reporting, according to an embodiment of the invention. In step 500, the sensors 103 capture sensor data from within the environment 101. The sensor data is transmitted to the edge compute server 107, and subsequently transmitted to the controller 120.

In another embodiment, some or all of the sensor data may be processed locally by the edge compute server 107, as described above. In this embodiment, the received sensor data may be processed by the edge compute server 107 as it is received, or may be stored in a memory (not shown) or any other non-volatile storage for later processing, or both.

In an embodiment, the edge compute server 107 can process or pre-process the sensor data, such as a video feed, and generate a modified video feed. Such processing can include, but is not limited to, adding metadata to the video feed, partitioning the video feed, identifying and marking objects in the video feed, localizing objects in the video feed, redacting portions of the video feed, tagging objects in the video feed, and the like. The modified video feed is then transmitted from the edge compute server 107 to the controller 120.

In step 501, the controller 120 receives the sensor data (or modified sensor data) from the edge compute server 107 via the network 108. The sensor data may be processed by the controller 120 as it is received on-the-fly, or may be stored in a memory (not shown) or any other non-volatile storage for later processing, or both.

In step 502, the objects of interest are identified within the video feed by the object of interest identification module 402, as described above with reference to FIG. 4.

In step 504, the objects of interest are localized within each received frame in the video feed by the localization module 404, as described above with reference to FIG. 4.

In step 506, the video feed is analyzed in order to identify various contextual metrics based on the tracking parameters by the contextual processing module 406, as described above with reference to FIG. 4.

Figure 6:
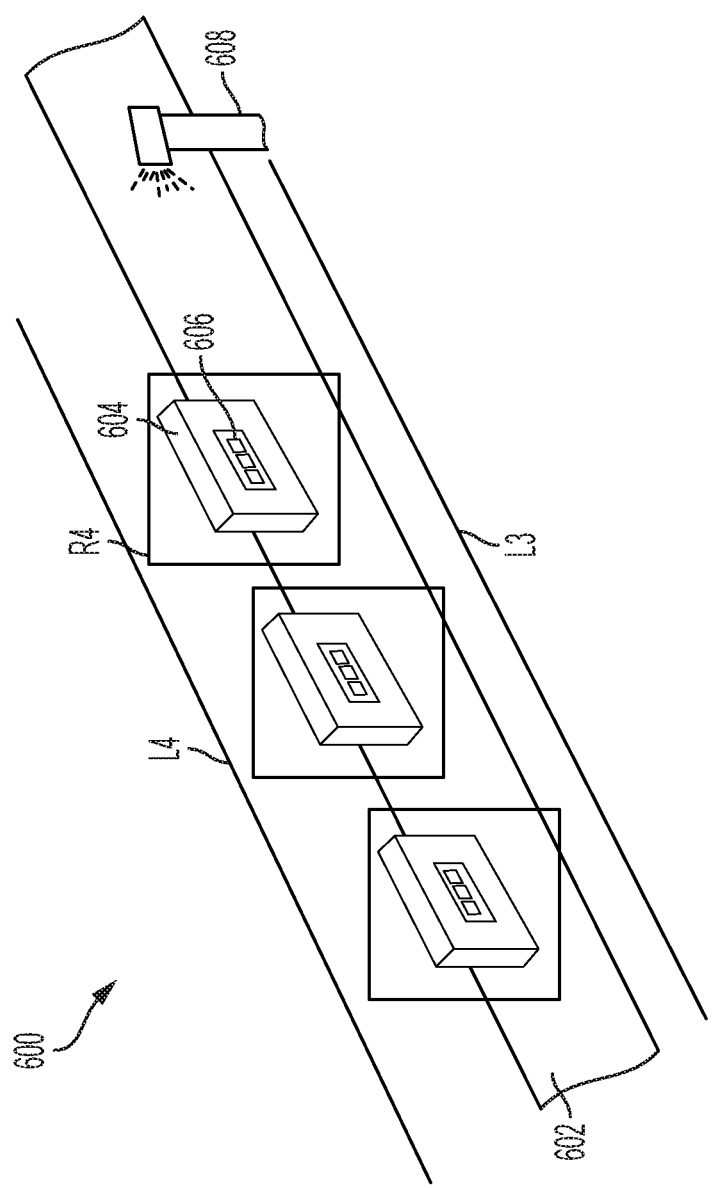
FIG. 6 is a depiction of a video still annotated with objects of interest on a conveyor environment, according to an embodiment of the invention.

FIG. 6 is a depiction of a video still 600 annotated with objects of interest on a conveyor environment, according to an embodiment of the invention. In an embodiment, the video still 600 depicts a conveyor 602 which transports objects 604. The user 105 has selected to track the objects 604 by placing a rectangle R4 around each object 604. The user has also selected to track transport of the objects 604 along the conveyor 602 by placing parallel boundary lines L3 and L4 on opposite sides of the conveyor 604.

In this embodiment, the annotations on the video still 600 can be used by the platform 110 to track, for example, whether any portion of the object 604 is not fully contained on the conveyor 602, and when any object 604 is falling, has a high probability to fall, or has fallen, off the conveyor 602, when it is detected that any rectangle R4 has intersected with either boundary line L3 and L4.

In an embodiment, the annotations on the video still 600 can be used by the platform 110 to track the number of objects 604 that have traversed the conveyor 602, or the number of objects 604 which have traversed a specific portion of the conveyor 602.

In an embodiment, the orientation of the rectangle R4 can be analyzed by the platform 110 to track whether the object 604 is not properly placed or oriented on the conveyor 602. For example, the angular orientation of the rectangle R4 can be analyzed to determine if it remains within a predetermined threshold that indicates proper length-wise orientation on the object 604 that allows for scanning of the label 606 by the scanner 608. In the event that the angular orientation of the rectangle R4 is outside of the predetermined threshold, the platform 110 can determine that a scanning operation may fail due to improper alignment of the object 604 on the conveyor 602.

In an embodiment, the rectangle R4 is dynamic in that it corresponds to the shape of the object 604. In the event that the object 604 is distorted while in transit on the conveyor 602, the platform 120 can analyze the spatial and dimensional characteristics of the rectangle R4 in order to track damage to objects 604, as well as to locate a point in time or position on the conveyor 602 where such damage may have occurred.

Figure 7:
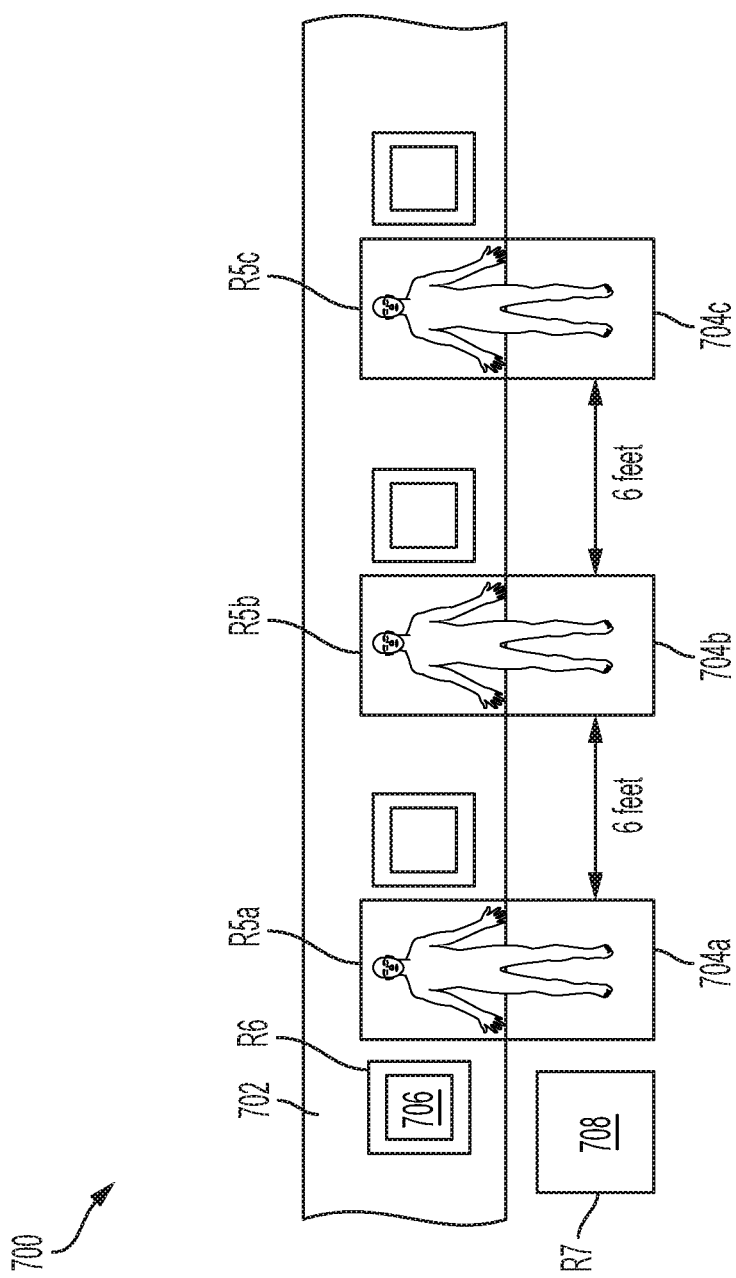
FIG. 7 is a depiction of a video still annotated with objects of interest in an assembly line environment, according to an embodiment of the invention.

FIG. 7 is a depiction of a video still 700 annotated with objects of interest in an assembly line environment, according to an embodiment of the invention. In an embodiment, the video still 700 depicts an assembly line 702 having workers 704a-c. In addition, objects 706 travel along the assembly line 702 from worker 704a towards worker 704c. The user 105 has selected to track the workers 704 by placing rectangles R6a-c around each worker 704a-c, respectively. The user 105 has also selected to track the objects 706 by placing rectangles R6 around each object 706. In addition, the user 105 has selected to track drop zone 708 by placing rectangle R7 around the drop zone 708.

In an embodiment, the controller 120 can track the distances between each worker 704, for example, in order to track compliance with separation and social distancing guidelines and requirements, such as, for example, a 6-foot separation to reduce the spread of COVID-19. In this embodiment, the platform 110 can monitor the distances between each rectangle R5. When, for example, the distance between rectangle R5a and R5b is less than six feet, it is detected that workers 704a and 704b are not adhering to the separation and social distancing guidelines.

In an embodiment, the sensors 103 can include thermal imaging capabilities, and the sensor data includes thermal data related to the workers 704. In this embodiment, the controller 120 can track body temperatures of the workers 704 to determine if any worker 704 may have an elevated temperature that indicates potential sickness.

In an embodiment, if the objects 706 require to be maintained at a certain temperature, such as below 45 degrees Fahrenheit for consumable products, the controller 120 can track the temperatures of the objects 706 to determine if any object 706 may have exceeded a temperature threshold that indicates potential spoilage.

In an embodiment, the platform 110 can also track when an object 706 has fallen off the assembly line 702 by monitoring the intersection of rectangle R6 for the object 706 and rectangle R7 for the drop zone 708.

Figure 8:
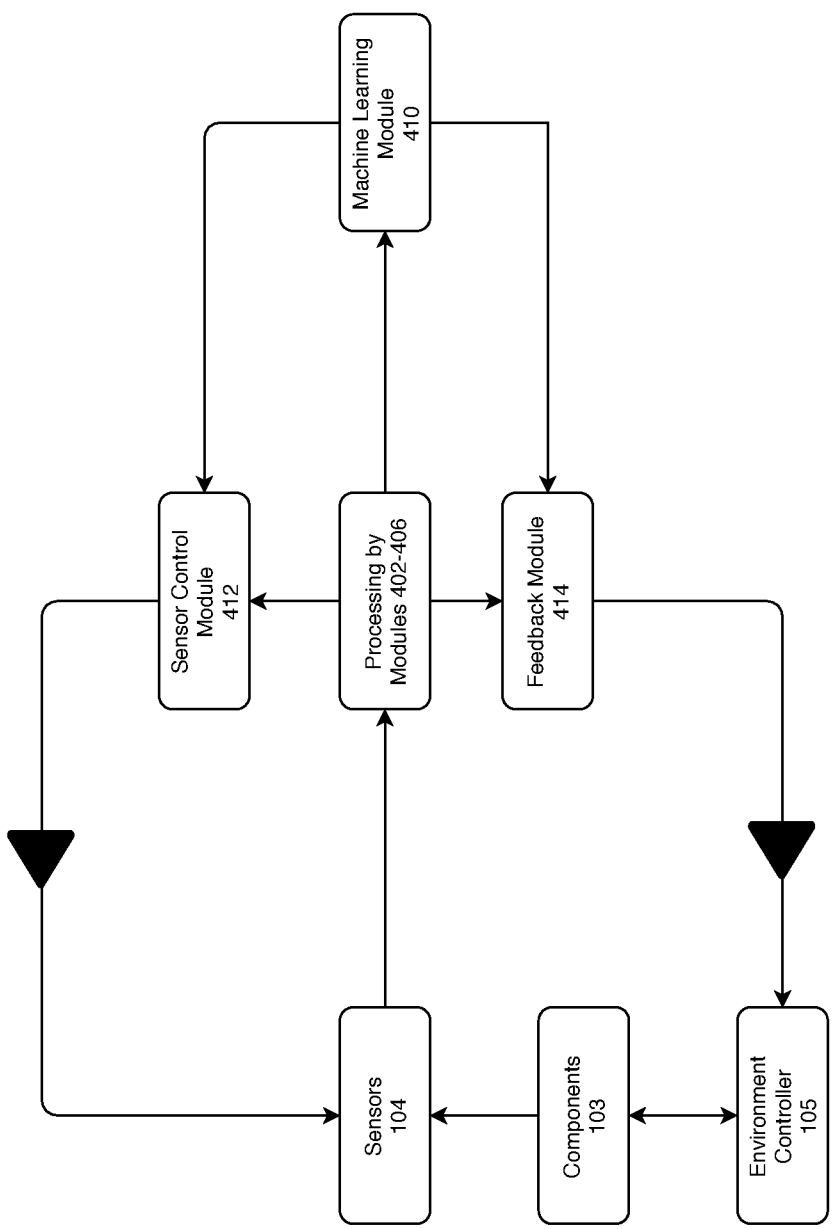
FIG. 8 is a flowchart illustrating a feedback loop for controlling operating parameters in an environment using learning-based processing of sensor data, according to an embodiment of the invention.

FIG. 8 is a flowchart illustrating a feedback loop for controlling operating parameters in the environment 101 using learning-based processing of sensor data, according to an embodiment of the invention. In an embodiment, the sensor data is processed by the modules 402-406, as described above with reference to FIGS. 4 and 5. The machine learning module 410 is configured to process the analysis generated by at least one of the modules 402-406.

In an embodiment, the feedback module 414 is configured to adjust operating parameters within the environment 101 based on, at least in part, the analysis generated by the contextual processing module 406 and/or data received from the machine learning module 410. In an embodiment, feedback module 414 can transmit a feedback signal to the environment controller 104 which causes the environment controller 104 to modify the operation of one of more components 102.

In addition, the sensor control module 412 is configured to control the sensors 103 based on, at least in part, the analysis generated by the contextual processing module 406 and/or data received from the machine learning module 410. In an embodiment, the sensor control module 412 can transmit a feedback signal to the sensors 103 which causes the sensor 103 adjust operating parameters as described above with reference to FIG. 4.

Figure 9A:
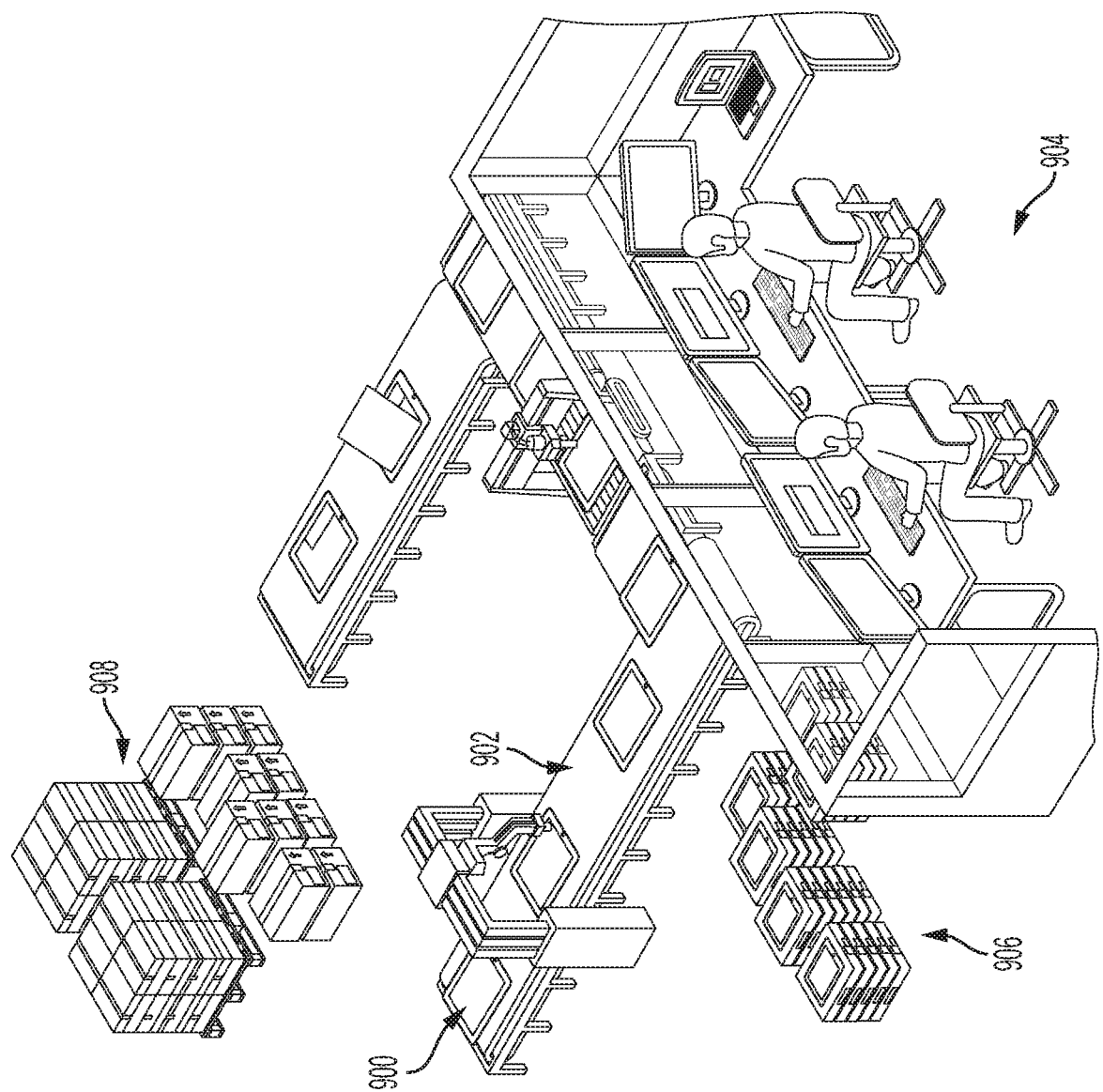
FIG. 9A is a depiction of a live video feed, according to an embodiment of the invention.

FIG. 9A is a depiction of a live video feed, according to an embodiment of the invention. In an embodiment, objects 900 move along a conveyor 902, where they pass workers 904. At the beginning of the conveyor 902, there is an object cluster 906 representing unpacked objects, and at the end of the conveyor 902 there is another object cluster 908, represented packaged objects. In this embodiment, the objects 900 and workers 904 are objects of interest.

In an embodiment, the user 105 can zoom, pause, fast-forward, rewind, and replay the live video feed. For example, the user 105 can zoom into the location of the workers 904 to monitor the detailed activity of the workers 904.

Figure 9B:
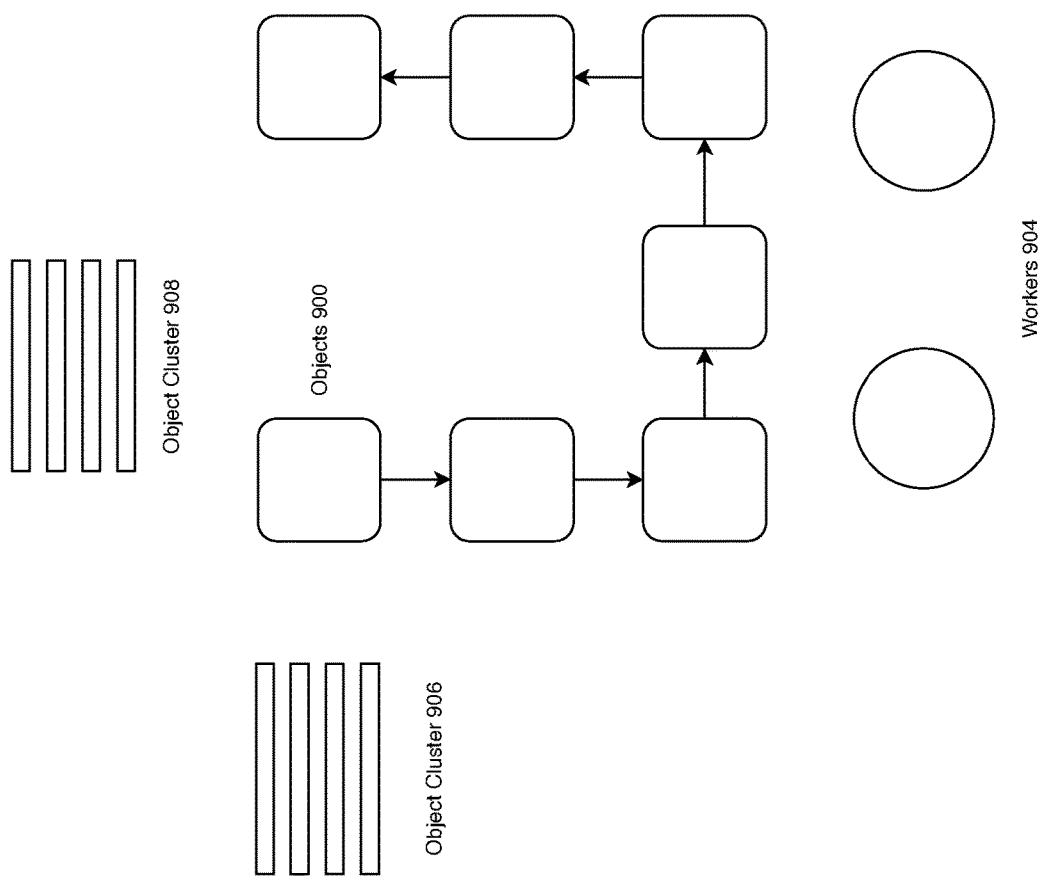
FIG. 9B is a depiction of a visualized data flow feed of a live video feed, according to an embodiment of the invention.

FIG. 9B is a depiction of a visualized data flow feed of the live video feed of FIG. 9A, according to an embodiment of the invention. In an embodiment, the platform 110 can assign a symbol, icon, graphic, avatar, user-uploaded image, color, or other graphical representation to the objects of interest. In an embodiment, the user 105 can customize the appearance of each object of interest manually.

In this embodiment, the objects 900 are displayed are rounded squares, while the workers 904 are displayed as circles. The arrows between the objects 900 indicate a direction of travel of the objects 900. The object clusters 906 and 908 are displayed as stacked objects.

In an embodiment, the display module 400 processes the live feed video and renders the visualized data flow feed. The visualized data flow feed can be utilized to monitor a real-time traffic view of the environment 100, as well as to identify bottleneck areas, clusters of objects and humans, and the like.

In an embodiment, the user 105 can zoom, pause, fast-forward, rewind, and replay the visualized data flow feed. For example, the user 105 can zoom into the object cluster 906 and view any sub-clusters that may be contained therein (not shown).

In an embodiment, the user 105 can toggle between the live video feed and the visualized data flow feed. In another embodiment, the user 105 can select to overlay (i.e., augment) the visualized data flow feed over the live video feed, and vice-versa. In this embodiment, the user 105 can select only specific objects of interest to overlay.

FIG. 10 is a depiction of an exemplary metric reporting dashboard 1000, according to an embodiment of the invention. In an embodiment, the metric reporting dashboard 1000 can include various metric reports 1002 generated by the metric reporting module 408. The metric reports 1002 can take various forms, such as charts/graphs, maps, visualized data flow feeds, multimedia feeds, text, and the like.

In an embodiment, the charts/graphs can include, but are not limited to, bar charts, area charts, a pie charts, line charts, column graphs, scatter plots, bubble charts, gauge charts, doughnut charts, Cartesian graphs, histograms, pictographs, and combinations thereof.

In an embodiment, the maps can include, but are not limited to, cluster maps, heat maps, thermal imaging maps, choropleth maps, proportional symbol maps, dot density maps, animated time-series maps, and the like.

In an embodiment, the metric reports 1002 can be static (i.e., non-moving), or dynamic such that the output reflects real-time, or near-real-time, changes in the sensed data and/or analysis generated by the metric reporting module 408.

In an embodiment, the metric reports 1002 can be interactive, such that the user 105 can selectively modify the form, style, colors, data refresh rate, and the like of the metric reports 1002. For example, the user 105 can selectively change a line chart into a bar chart, can selectively change a color or pattern representing a sensor value, can adjust the refresh rate at which any dynamic metric reports are updated, and the like. Such modifications by user 105 can result in real-time or near real-time changes to the metric reports 1002.

In an embodiment, the user 105 can re-arrange the layout of the dashboard 1000 and can selectively order the position of each metric report 1002.

In an embodiment, the user 105 can select a data point, a series of data points, or a location on any metric report 1002, and the controller 120 can dynamically "drill-down" into the selected data, and cause the metric reporting module 408 to generate a drilled-down analysis that is output to the dashboard 1000.

In an embodiment, the user 105 can extract data from any metric report 1002 into a tabular format, such as, for example, CSV (comma separated values), TSV (tab separated values), DIF, XLS, XLSX, and the like. The user 105 can select specific timepoints or time ranges to extract, as well as can extract an entire data set relative to a metric report 1002. In this embodiment, extracted data can subsequently be analyzed, simulated, and modeled by the user 105 using third-party tools and software. In an embodiment, the platform 110 can be utilized by the user 105 for such analysis, simulation, and modeling purposes.

In an embodiment, the user 105 can selectively export metric reports 1002 into various formats, such as, for example, DOC, PDF, OLAP, HTML, PPT, and the like. In addition, the user 105 can selectively export metric reports 1002 into various image formats, such as, for example, JPG, BMP, GIF, TIF, PNG, CGM, SVG, WMF, and the like), as well as video and animation formats, such as, for example, AVI, MOV, MP4, MPEG, QT, RM, SWF, WMV, 3GP, OGG, WEBM, FLV, AVI, and the like.

In an embodiment, the metric reports 1002 can be in the form of overlaid (i.e., augmented) content over the objects of interest and any other pertinent portion within the visualized data flow feed. Such overlaid data can include hotspots or bubbles over portions of the visualized data flow feed to indicate a large concentration of objects. For example, hotspots can be displayed to indicate potential bottlenecks in an assembly line, to indicate non-compliance with separation and social distancing guidelines, etc.

In an embodiment, the metric reports 1002 can be in various multimedia formats, including, but not limited to, video feeds, static images, and image slideshows with overlaid analysis generated by the metric reporting module 408. In an embodiment, the dashboard can display a video stream (real-time live or pre-recorded) of the pick-and-place environment shown in FIG. 3. The video stream can have overlaid (i.e., augmented) content over the objects of interest and any other pertinent portion of the video feed.

In this embodiment, certain portions of the video feed may be removed, blurred, masked, obfuscated, or otherwise redacted from the video feed, such as for data privacy and confidentiality concerns or regulations, intellectual property issues, and for user preferences to reduce crowding and density of unimportant elements in the video feed. For example, faces of workers who may appear in the video feed can be blurred. This example is non-limiting and is not intended to limit the scope of the invention.

In another embodiment, certain portions of the video feed may be highlighted, shaded, or otherwise made more prominent. For example, in the pick-and-place environment shown in FIG. 3, the end-effector 308 may be colored a bright color so that the user 105 can monitor movements while viewing the overlaid analysis.

In yet another embodiment, the video feed may display only the objects of interest, along with the overlaid analysis, and all other portions of the video feed may be redacted. This embodiment allows the user 105 to isolate the objects of interest while viewing the overlaid analysis.

In an embodiment, the metric reports 1002 can be in text format, such as for example, tabular data, sentence format, alert words, and the like. For example, the dashboard 1000 can display a stream (real-time live or pre-stored) of text-based data of the analysis generated by the metric reporting module 408.

In another embodiment, the metric reports 1002 can be output in sentence format. The analysis generated by the metric reporting module 408 can be processed by the learning module 410 prior to output to the dashboard 1000, and output as human-readable sentences. The learning module 410 can utilize a machine translation process that utilizes, for example, a learning-based algorithm. For example, the dashboard can display a report as follows: "Between 10 am ET and 4 pm ET the robot utilization rate was 85%, and the robot experienced a 4% error rate during this period." This example is non-limiting and is not intended to limit the scope of the invention.

In an embodiment, the user 105 can store any of the metric reports 1002 displayed on the dashboard 1000. In addition, the user 105 can search, browse, and retrieve pre-stored, or previously stored, metric reports using the dashboard 1000. In an embodiment, the metric reports are stored on the database 114, or alternatively, can be stored locally by the user 105.

In an embodiment, the user 105 can search the database 114 for stored metric reports 1002 through visual searching, text-based searching, semantic searching, and combinations thereof.

In an embodiment, the user 105 can access platform 110, and specifically the dashboard and user interface by navigating to a secure website via a Uniform Resource Location (URL) using a browser on the user device 106. In the embodiment, the dashboard 1000 and user interface are provided as software as a service (SaaS) applications, while the platform 110 is provided as a platform as a service (PaaS) application.

In an embodiment, prior to being able to access the platform 110, the user 105 must enter credentials, such as a login and password, or other indicia that verifies their identity. The credentials can include user's mobile device number, login, password, email address, phone number, account number, personal identification number (PIN), name, driver's license number, social security number, birthdate, employee number, and/or a unique account identification code previously provided to the user 105 by the provider 122, or another an authorizing entity, such as an employer. In another embodiment, the credentials can be biometric, such as a fingerprint, iris, facial, or voice scan. In yet another embodiment, the credential can be a gesture input by the user 105 to the user device 106.

While the principles of the disclosure have been illustrated in relation to the exemplary embodiments shown herein, the principles of the disclosure are not limited thereto and include any modification, variation or permutation thereof.

What is claimed is:

1. A method for generating contextual metrics related to an activity occurring within an environment, comprising:
    transmitting a video feed from at least one video camera located in the environment to a server;
    receiving the video feed by the server;
    displaying, by the server, the video feed on a user device;
    receiving, by the server via the user device, a timepoint to generate a video still of the video feed;
    generating, by the server, the video still;
    displaying, by the server, the video still on the user device;
    receiving, by the server via the user device, at least one annotation that indicates an object of interest;
    receiving, by the server via the user device, at least one tracking parameter related to the object of interest;
    receiving, by the server via the user device, at least one reporting policy;
    determining, by the server, at least one contextual metric related to the object of interest based on the tracking parameter, wherein the contextual metric is determined using a computational geometry method; and
    generating, by the server, a report related to the contextual metric,
    wherein in order to determine the contextual metric, the server performs a first operation that utilizes a non-learning-based algorithm to identify the object of interest in a frame of the video feed, and wherein the server performs a second operation that utilizes a learning-based algorithm to identify the object of interest in the frame of the video feed if the first operation is unsuccessful.

2. The method of claim 1, wherein the annotation is in the form of a shape placed around the object of interest.

3. The method of claim 2, wherein the annotation is a free-form shape.

4. The method of claim 1, wherein the annotation is selected by a user from a list of pre-stored annotations displayed on the user device.

5. The method of claim 1, wherein the tracking parameter is selected by a user from a list of pre-stored tracking parameters displayed on the user device.

6. The method of claim 1, wherein the non-learning-based algorithm is a feature detector and descriptor extractor algorithm.

7. The method of claim 1, wherein the learning-based algorithm is selected from a group consisting of a deep learning algorithm, a neural network algorithm, a machine learning algorithm, an artificial intelligence algorithm, and a fuzzy logic computing algorithm.

8. A method for generating contextual metrics related to an activity occurring within an environment, comprising:
    transmitting a video feed from at least one video camera located in the environment to a server;
    receiving the video feed by the server;
    displaying, by the server, the video feed on a user device;
    receiving, by the server via the user device, a timepoint to generate a video still of the video feed;
    generating, by the server, the video still;
    displaying, by the server, the video still on the user device;
    receiving, by the server via the user device, at least one annotation that indicates an object of interest;
    receiving, by the server via the user device, at least one tracking parameter related to the object of interest;
    receiving, by the server via the user device, at least one reporting policy;
    determining, by the server, at least one contextual metric related to the object of interest based on the tracking parameter, wherein the contextual metric is determined using a computational geometry method; and
    generating, by the server, a report related to the contextual metric,
    wherein in order to determine the contextual metric, the server performs a first operation that utilizes a neighborhood-based tracking algorithm to localize the object of interest in a frame of the video feed, and wherein the server performs a second operation that utilizes a learning-based algorithm to localize the object of interest in the frame of the video feed if the first operation is unsuccessful.

9. The method of claim 8, further comprising receiving, by the server, non-video data from a sensor configured to capture non-video data from the environment, wherein the server utilizes the non-video data for at least one of identifying the object of interest and localizing the object of interest in the frame of the video feed.

10. The method of claim 8, wherein the report is an interactive report.

11. The method of claim 10, wherein the report is an interactive report that is updated in real-time based on manipulations to the interactive report by a user.

12. The method of claim 8, wherein the learning-based algorithm is selected from a group consisting of a deep learning algorithm, a neural network algorithm, a machine learning algorithm, an artificial intelligence algorithm, and a fuzzy logic computing algorithm.

13. The method of claim 8, further comprising displaying, by the server, the report on the user device.

14. The method of claim 8, further comprising, transmitting, by the server, the report to a recipient designated in the reporting policy.

15. A system for generating contextual metrics related to an activity occurring with an environment, comprising:
 a video camera configured to capture a video feed in the environment;
 an edge server configured to receive the video feed from the video camera, the edge server configured to generate a modified video feed; and
 a platform server configured to receive the modified video feed,
 the platform server further configured to identify an object of interest within a plurality of frames in the modified video feed,
 the platform server further configured to localize the object of interest within the plurality frames in the modified video feed,
 the platform server further configured to determine at least one contextual metric related to the object of interest based on the tracking parameter, wherein the contextual metric is determined using a computational geometry method, wherein in order to determine the contextual metric, the server performs a first operation that utilizes a non-learning-based algorithm to identify the object of interest in a frame of the video feed, and wherein the server performs a second operation that utilizes a learning-based algorithm to identify the object of interest in the frame of the video feed if the first operation is unsuccessful.

16. The system of claim 15, wherein the edge server is configured to perform pre-processing of the video feed in order identify the object of interest, wherein the pre-processing is selected from a group consisting of identifying the object of interest within the plurality of frames in the video feed, localizing the object of interest within the plurality of frames in the video feed, and determining the contextual metric related to the object of interest based on the tracking parameter.

17. The system of claim 15, wherein the platform is configured to utilize at least one of the learning-based algorithm and the non-learning-based algorithm in order to identify the object of interest.

18. The system of claim 15, wherein the platform is configured to utilize at least one of a neighborhood-based tracking algorithm and the learning-based algorithm in order to localize the object of interest.

19. The system of claim 15, wherein the object of interest is selected from a group consisting of a robot, an autonomous vehicle, and a physical item being transported on machinery.

20. The system of claim 15, further comprising a sensor configured to capture non-video data from the environment, and further configured to transmit the non-video data to the edge server or the platform server.

* * * * *